United States Patent
Cheng et al.

(10) Patent No.: US 7,969,506 B2
(45) Date of Patent: Jun. 28, 2011

(54) CRADLE FOR CONNECTING TO PORTABLE ELECTRONIC APPARATUS

(75) Inventors: Yi-Tsung Cheng, Taipei Hsien (TW); Chia-Hsing Liao, Taipei Hsien (TW); Hsiu-Hung Chou, Taipei Hsien (TW); Guo-Bin Fang, Taipei Hsien (TW); Chih-Chung Teng, Taipei Hsien (TW); Yu-Ping Hsu, Taipei Hsien (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 12/632,814

(22) Filed: Dec. 8, 2009

(65) Prior Publication Data

US 2010/0088530 A1 Apr. 8, 2010

Related U.S. Application Data

(63) Continuation of application No. 11/289,866, filed on Nov. 29, 2005, now Pat. No. 7,675,571.

(30) Foreign Application Priority Data

Jun. 29, 2005 (TW) .............................. 94121962 A

(51) Int. Cl.
*H04N 5/225* (2006.01)

(52) U.S. Cl. ..................................... 348/375; 348/376
(58) Field of Classification Search .................. 348/375, 348/376, 372, 207.99, 374; 455/57; 710/62
See application file for complete search history.

(56) References Cited

U.S. PATENT DOCUMENTS

| 6,633,932 B1 * | 10/2003 | Bork et al. ...................... 710/72 |
| 7,167,207 B2 * | 1/2007 | Kawaguchi et al. .......... 348/375 |
| 7,320,077 B2 * | 1/2008 | Kim .................................. 713/300 |
| 7,330,215 B2 * | 2/2008 | Ito ................................... 348/375 |

* cited by examiner

*Primary Examiner* — David L Ometz
*Assistant Examiner* — Ahmed Berhan
(74) *Attorney, Agent, or Firm* — CKC & Partners Co., Ltd.

(57) ABSTRACT

A cradle for connecting to a portable electronic apparatus is described. The cradle includes an AC adapter connector, a USB connector, a mini USB plug, and a USB signal detecting circuit. The USB connector is used to connect to a USB interface of a computer. The mini USB plug is used to connect to the portable electronic apparatus. The USB signal detecting circuit detects the USB_D+ and the USB_D− of the USB connector. When the computer is suspended from an operating state, the portable electronic apparatus is charged by the AC adapter through the mini USB plug. When the computer resumes normal operation, the USB connection between the portable electronic apparatus and the computer is automatically reestablished.

10 Claims, 2 Drawing Sheets

CRADLE FOR CONNECTING TO PORTABLE ELECTRONIC APPARATUS

RELATED APPLICATIONS

The present application is based on, and claims priority from, Taiwan Application Serial Number 94121962, filed Jun. 29, 2005, the disclosure of which is hereby incorporated by reference herein in its entirety.

BACKGROUND OF THE INVENTION

1. Field of Invention

The invention relates to a cradle for connecting to a portable electronic apparatus and, in particular, to a cradle that automatically switches between the USB connection and the AC adapter.

2. Related Art

In the past, portable electronic devices, such as the handheld multimedia mobile devices like PDAs, PDA phones, smart phones, mobile phones, MP3 players, Portable Media Players (PMP), Digital Videos (DV) and Digital Cameras (DC), can be connected to a computer to establish a USB connection. They can also use an AC adapter to charge their batteries. More and more devices are being configured with a mini USB as the I/O interface as the devices are designed increasingly smaller and lighter weight. PDAs especially exemplify this trend.

When establishing a USB connection using the mini USB, a PDA is not charged by the AC adapter. When using the USB to charge via the AC adapter, the PDA interrupts the USB connection to the computer. It is then necessary to manually reestablish the connection. The USB connection to the computer is also interrupted and remains broken when the computer suspends from its operating state. When the computer resumes operation, the PDA does not automatically reconnect to the computer using the USB port. Therefore, the conventional PDA cradle has many disadvantages.

Therefore, a new cradle for solving the above-mentioned inconvenience is necessary and very important to the field.

SUMMARY OF THE INVENTION

An object of the invention is to provide a cradle for connecting to a portable electronic apparatus, such that the cradle uses a single mini USB connector to switch between the charge mode and the USB connection mode.

Another object of the invention is to provide a cradle for connecting to a portable electronic apparatus, such that the cradle can automatically detect a USB connection or transformer charging.

Yet another object of the invention is to provide a cradle for connecting to a portable electronic apparatus, such that the computer can automatically reestablish the connection without having to physically reconnect the USB wire when the computer is restored from suspension.

In accord with the above objects, the invention provides a cradle for connecting to a portable electronic apparatus. According to a preferred embodiment of the invention, the cradle includes an AC adapter connector, a USB connector, a mini USB plug, and a USB signal detecting circuit.

The adapter connector is used to connect to an AC adapter. The USB connector has a USB_D+ and a USB_D− contact. The USB connector is used to connect to a computer USB interface. The mini USB plug is used to connect to a portable electronic apparatus.

The USB signal detecting signal detects the USB_D+ and USB_D− contact of the USB connector. When the computer is suspended from an operating state, the portable electronic apparatus is charged via the mini USB plug by the AC adapter. When the computer resumes its operating state, the portable electronic apparatus automatically reestablishes the USB connection with the computer.

The invention has at least the following advantages, wherein each embodiment has one or more advantages. The disclosed cradle can use a single mini USB connector to switch between a charge mode and a USB connection mode. The disclosed cradle can automatically detect a USB connection or transformer charging. And, the disclosed cradle can automatically reestablish the connection once the computer resumes its operating state without having to physically reconnect the USB wire.

BRIEF DESCRIPTION OF THE DRAWINGS

The invention will become more fully understood from the following detailed description taken in conjunction with the accompanying drawings, which serve to illustrate and not limit the invention, wherein.

DETAILED DESCRIPTION OF THE INVENTION

The present invention will be apparent from the following detailed description, which proceeds with reference to the accompanying drawings, wherein the same references relate to the same elements.

Figure 1:
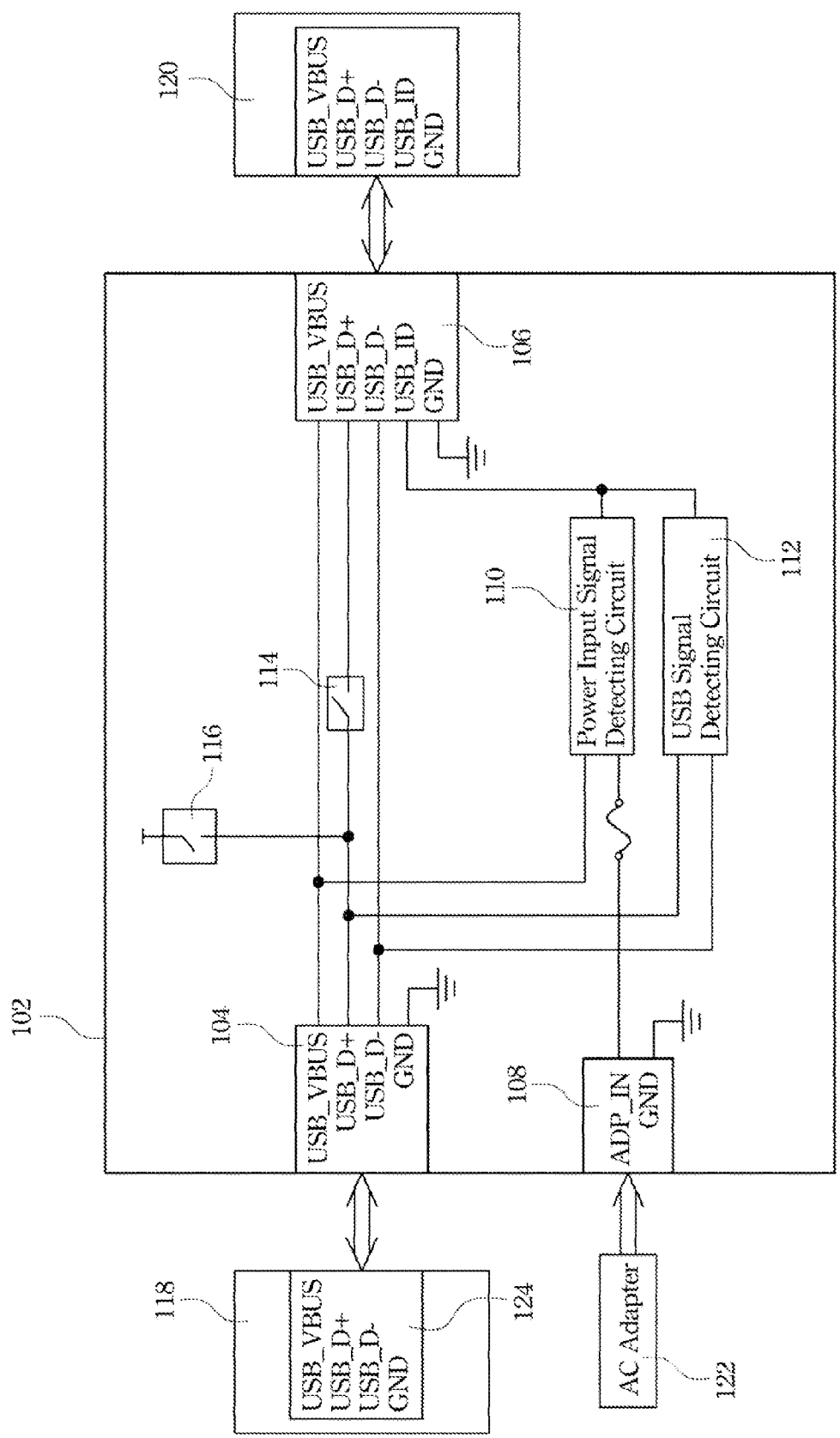
FIG. 1 is a block diagram of an embodiment of the invention.

With reference to FIG. 1, the disclosed cradle 102 is used to connect to a portable electronic apparatus 120. Via the cradle 102, the portable electronic apparatus 120 can be charged or connected to a computer 118 via its USB interface 124.

The cradle 102 has a USB connector 104, an AC adapter connector 108, and a mini USB plug 106. The USB connector 104 is connected to the USB interface 124 of the computer 118. The AC adapter connector 108 is connected to an AC adapter 122. The mini USB plug 106 is connected to a portable electronic apparatus 120.

When only the computer 118 is connected to the cradle 102, the cradle 102 establishes a USB connection via the USB connector 104 and the mini USB plug 106. The computer 118 can thus exchange data with the portable electronic apparatus 120.

When only the AC adapter 122 is connected to the cradle 102, the portable electronic apparatus 120 is charged via the cradle 102. The portable electronic apparatus 120 is charged via USB_VBUS of the mini USB plug.

When the computer 118 is connected to the cradle 102 and the AC adapter 122 is also connected to the cradle 102, the cradle 102 determines whether to establish a USB connection or to charge, depending upon the situation. When the computer 118 is in an operating state, the cradle 102 has a higher priority to establish the USB connection. Therefore, the computer 118 and the portable electronic apparatus 120 are in the USB connection state. In other words, the priority of the USB connection is higher than the connection to the AC adapter 122. When the computer 118 is suspended, the cradle 102 allows the portable electronic apparatus 120 to be charged via the AC adapter 122. The charging is performed by the AC adapter 122 via the AC adapter connector 108 and the USB_VBUS of the mini USB plug 106.

Of course, when the portable electronic apparatus 120 and the computer 118 are in the USB connection state, USB_VBUS of the USB connector 104 and USB_VBUS of the mini USB plug 106 are connected together, which allows a small charging current. This charging current through the computer 118 is smaller (about 500 mA) than the charging current via the AC adapter 122 (the maximum charging current provided by the AC adapter).

Figure 2:
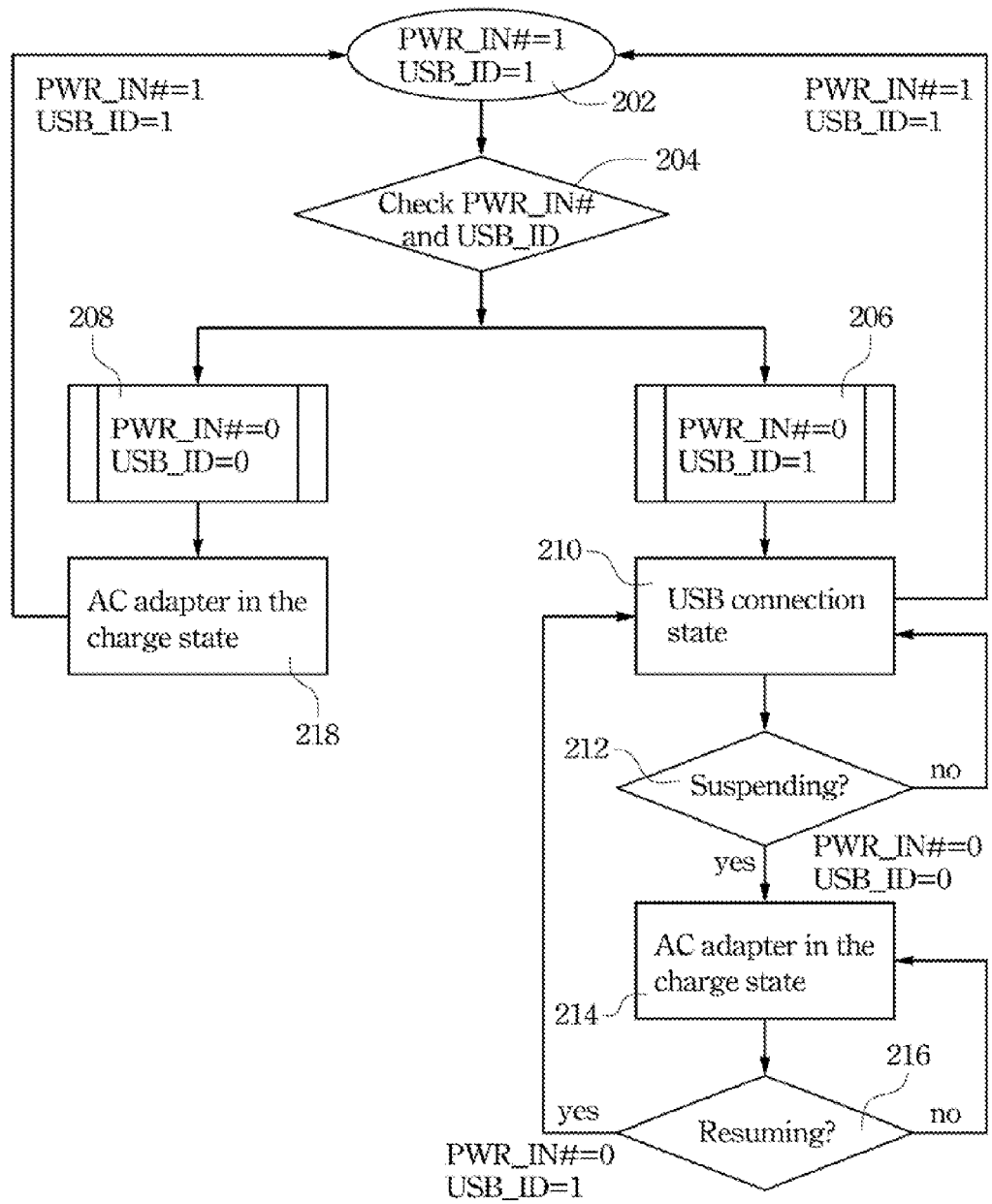
FIG. 2 is a flowchart showing the operation of the disclosed cradle.

FIG. 2 depicts the flowchart of operating the disclosed cradle. With simultaneous reference to FIGS. 1 and 2, when the cradle 102 is neither connected to the computer 118 nor to the AC adapter 122, the settings PWR_IN=1 and USB_ID=1 (step 202). PWR_IN=1 means that both USB_VBUS of the USB connector 104 and the AC power source do not have any power signal input.

Afterwards, a power input signal detecting circuit 110 detects whether there is any power input (usually 5V) at USB_VBUS of the USB connector and whether there is any power input at the AC adapter connector 108 (step 204). If the AC adapter connector 108 receives a power input and the USB connector 104 does not receive any power input, the settings PWR_IN=0 and USB_ID=0 (step 208). At this moment, the cradle 102 enters the AC adapter charging mode. The maximum charging current provided by the AC adapter is used to charge the portable electronic apparatus 120 via USB_VBUS of the mini USB plug 106 (step 218). When the AC adapter 122 is removed, the cradle 102 returns to the settings PWR_IN=1 and USB_ID=1 (step 202).

If the USB connector 104 receives a power input, the settings become PWR_IN=0 and USB_ID=1 (step 206). At this moment, the portable electronic apparatus 120 and the computer 118 establish a connection via a USB cable. The cradle 102 is connected to USB_VBUS of the mini USB plug 106 via USB_VBUS of the USB connector 104 to charge the portable electronic apparatus 120. The current is about 500 mA (step 210).

If the USB connector 104 receives a power input and the AC adapter 122 is connected to the AC adapter connector 108, the settings are PWR_IN=0 and USB_ID=1 (step 206). In this case, the USB connection is established. The cradle 102 is connected to USB_VBUS of the mini USB plug 106 via USB_VBUS of the USB connector 104 to charge the portable electronic apparatus 120. The current is about 500 mA (step 210).

Afterwards, a USB signal detecting circuit 112 detects whether the computer is in an operating state or suspended state (step 212). When the timing on USB_D+ and USB_D− contact of the USB connector 104 has a specific variation (e.g. the period during which it is not maintained at a specific potential level is greater than 300 ms), then the USB signal detecting circuit 112 determines that the computer 118 is in an operating state and keeps the original USB connection.

When the timing on USB_D+ and USB_D− contact of the USB connector 104 does not have a specific variation (e.g. the period during which it is maintained at a specific potential level is greater than 300 ms), then the USB signal detecting circuit 112 determines that the computer 118 is in a suspended state. The settings of the cradle 102 are then PWR_IN=0 and USB_ID=0 (step 214). At this moment, the cradle 102 disconnects the switch 114 and uses the switch 116 to pull high USB_D+ of the USB connector 104, so that USB_D+ of the USB connector 104 is maintained at a predetermined high voltage. Although the settings are PWR_IN=0 and USB_ID=0, the computer 118 still considers the portable electronic apparatus 120 to be in a USB connected state for the convenience of restoring the USB connection in the future.

In step 214, the computer 118 still considers the portable electronic apparatus 120 to be in the USB connected state. However, the AC adapter 122 charges the portable electronic apparatus via USB_VBUS of the mini USB plug 106. In this case, the charging current can reach the maximum provided by the AC adapter.

Afterwards, the USB signal detecting circuit 112 continues detecting the timing on USB_D+ and USB_D− contact of the USB connector 104 to determine if there is any specific variation (e.g. it is maintained at a specific potential level). If the timing has any variation, the USB signal detecting circuit 112 considers the computer 118 as back to its operating state. The cradle 102 has the settings PWR_IN=0 and USB_ID=1. Moreover, the switch 114 resumes its connection, while the switch 116 is disconnected. Thus, USB_D+ of the USB connector 104 and USB_D− of the mini USB plug 106 are connected to resume the USB connection (step 216). At the same time, the 500 mA charging on USB_VBUS is also resumed (step 210).

If the timing on USB_D+ and USB_D− contact of the USB connector 104 has a continuous variation, then step 214 continues for the AC adapter 122 to charge the portable electronic apparatus 120. The above-mentioned portable electronic apparatus 120 may be a multimedia portable apparatus such as a PDA, PDA phone, smart phone, mobile phone, MP3 player, Portable Media Player (PMP), Digital Video (DV), and Digital Camera (DC).

The invention has at least the following advantages, wherein each embodiment features one or more of them. The disclosed cradle uses a single mini USB plug to switch between a charge mode and a USB connection mode. The disclosed cradle can automatically detect the USB connection or transformer charging. When the computer resumes operation from being suspended, the disclosed cradle can automatically reestablish the connection without having to physically reconnect the USB cable.

Certain variations would be apparent to those skilled in the art, variations which are considered within the spirit and scope of the following claims.

What is claimed is:

1. A cradle for connecting to a portable electronic apparatus, comprising:
   an AC adapter connector used to connect to an AC adapter;
   a USB connector having a USB_D+ and a USB_D− contact for connecting to a USB interface of a computer;
   a mini USB plug used to connect to the portable electronic apparatus;
   a USB signal detecting circuit, which detects the USB_D+ and the USB_D− contact of the USB connector to determine whether the computer is in an operating state where timing on the USB_D+ and the USB_D− contact of the USB connector has a specific variation or a suspended state where timing on the USB_D+ and the USB_D− contact of the USB connector has no specific variation; and
   a switch coupled between the USB D+ contact of the USB connector and a USB D+ contact of the mini USB plug, so that when the computer is suspended, the switch disconnects and the USB D+ contact of the USB connector is maintained at a high potential level via another switch;
   wherein when the computer is suspended from the operating state, the portable electronic apparatus is charged directly by the AC adapter via the mini USB plug and the AC adapter connector and establishes no USB connection with the computer, and when the computer resumes its operating state from the suspended state, the portable electronic apparatus automatically reestablishes the USB connection with the computer without having to physically reconnect the USB connector.

2. The cradle of claim 1, further comprising:
a power input signal detecting circuit for detecting a USB_VBUS of the USB connector and detecting an input power of the AC adapter, wherein the USB signal detecting circuit detects whether the computer is in its operating state when the USB_VBUS and the input power of the AC adapter exist concurrently.

3. The cradle of claim 1, wherein the USB signal detecting circuit determines that the computer in one of the operating state and a suspended state by a variation of timing on the USB_D+ and the USB_D− contact of the USB connector.

4. The cradle of claim 1, wherein the cradle uses a detection result of the USB signal detecting circuit to determine a USB_ID value of the mini USB plug.

5. The cradle of claim 1, wherein the portable electronic apparatus is a portable apparatus selected from the group consisting of a PDA, a PDA phone, a smart phone, a mobile phone, an MP3 player, a Portable Media Player (PMP), a Digital Video (DV), and a Digital Camera (DC).

6. A method for switching a connection state of a portable electronic apparatus, comprising:
receiving a USB signal by a computer via a USB interface;
detecting a USB_D+ and a USB_D− of the USB signal to determine whether the computer is suspended from an operating state where timing on the USB_D+ and the USB_D− contact of the USB connector has a specific variation;
charging the portable electronic apparatus via a mini USB interface directly by an AC adapter without establishing USB connection with the computer when the computer is in a suspended state where timing on the USB_D+ and the USB_D− contact of the USB connector has no specific variation;
automatically reestablishing a USB connection between the portable electronic apparatus and the computer when the computer restores its operating state from being suspended, wherein the USB connection is via the mini USB interface;
using a switch to disconnect the connection between the USB D+ of the USB interface and the USB D+ of the mini USB interface; and
using another switch to maintain a high voltage on the USB D+ of the USB interface.

7. The method of claim 6, further comprising:
detecting a USB-VBUS of the USB interface and detecting an input power of the AC adapter; and
detecting whether the computer is in an operating state when the USB_VBUS and the input power of the AC adapter exist concurrently.

8. The method of claim 6, further comprising:
determining that the computer is in one of the operating state and a suspended state by setting a USB_ID value of the mini USB interface.

9. The method of claim 6, further comprising:
using the USB_D+ and the USB_D− of the USB signal to determine a USB_ID value of the USB interface.

10. The method of claim 6, wherein the portable electronic apparatus is a portable apparatus selected from the group consisting of a PDA, a PDA phone, a smart phone, a mobile phone, an MP3 player, a Portable Media Player (PMP), a Digital Video (DV), and a Digital Camera (DC).

* * * * *

Disclaimer

7,969,506 B2—Yi-Tsung Cheng, Taipei Hsien (TW). CRADLE FOR CONNECTING TO PORTABLE ELECTRONIC APPARATUS. Patent dated June 28, 2011. Disclaimer filed April 14, 2011, by the assignee, HTC Corporation. .

The term of this patent shall not extend beyond the expiration date of patent no. 7,969,506.

(*Official Gazette January 10, 2012*)